United States Patent

Sato

Patent Number: 6,038,083
Date of Patent: Mar. 14, 2000

[54] COMPACT ZOOM LENS

[75] Inventor: Kenichi Sato, Ageo, Japan

[73] Assignee: Fuji Photo Optical Co., Ltd., Omiya, Japan

[21] Appl. No.: 09/024,421

[22] Filed: Feb. 17, 1998

[30] Foreign Application Priority Data

Mar. 26, 1997 [JP] Japan .................................... 9-093110

[51] Int. Cl.⁷ ................................................. G02B 15/14
[52] U.S. Cl. .......................................... 359/689; 359/686
[58] Field of Search ..................... 359/686, 689

[56] References Cited

U.S. PATENT DOCUMENTS

| | | | |
|---|---|---|---|
| 5,541,773 | 7/1996 | Kamo et al. | |
| 5,654,829 | 8/1997 | Ohtake | 359/686 |
| 5,801,887 | 9/1998 | Sato | 359/691 |
| 5,831,772 | 11/1998 | Nishio | 359/689 |
| 5,850,312 | 12/1998 | Kato | 359/689 |

FOREIGN PATENT DOCUMENTS

| | | |
|---|---|---|
| 5-113539 | 5/1993 | Japan . |
| 6-281860 | 10/1994 | Japan . |
| 7-218833 | 8/1995 | Japan . |

*Primary Examiner*—Georgia Epps
*Assistant Examiner*—Michael A Lucas
*Attorney, Agent, or Firm*—Arnold International; Bruce Y. Arnold

[57] ABSTRACT

A compact zoom lens including three lens groups having positive, positive and negative refractive power, in order from the object side. The distance between the first and second lens groups, as well as the distance between the second and third lens groups, is decreased when zooming from the maximum wide angle state to the maximum telephoto state. Aberrations are made favorable, even when in the maximum wide-angle state, by satisfying prescribed conditional expressions as well as by specifying prescribed lens element shapes for the first lens group and the third lens group. By arranging a negative meniscus lens element at the front of the first lens group with its concave surface on the photographic object side, curvature of field and distortion, which otherwise become a problem when in the maximum wide-angle, are suppressed. By arranging, immediately behind the negative meniscus lens element, a positive meniscus lens with its convex surface on the photographic object side, the back-focus of the compact zoom lens can be held short. Furthermore, in the third lens group, by arranging a negative meniscus lens element at the extreme photographic object side, and by figuring each surface of this lens element to be aspheric, the usual deterioration in imaging performance which accompanies compactness can be effectively prevented. Further, a diaphragm stop 2 is arranged between the first lens group G1 and the second lens group G2.

19 Claims, 5 Drawing Sheets

EMBODIMENT 1

WIDE

Spherical Aberration (mm)
F/5.10

Astigmatism (mm)
$\omega = 38.1°$
— S
---- T

Distortion
$\omega = 38.1°$

TELE

Spherical Aberration (mm)
F/7.10

Astigmatism (mm)
$\omega = 15.7°$
— S
---- T

Distortion
$\omega = 15.7°$

EMBODIMENT 2

WIDE

TELE

EMBODIMENT 3

WIDE

Spherical Aberration (mm)
F/5.10

Astigmatism (mm)
$\omega = 38.2°$
—— S
---- T

Distortion
$\omega = 38.2°$

TELE

Spherical Aberration (mm)
F/7.10

Astigmatism (mm)
$\omega = 15.6°$
—— S
---- T

Distortion
$\omega = 15.6°$

COMPACT ZOOM LENS

BACKGROUND OF THE INVENTION

The demand for high magnification, high performance, and compactness of the lens system used in a lens shutter camera has been increasing steadily over recent years. In response to these demands, extensive testing has been performed on the use of aspheric surfaces, the use of unique glass material, and in shutter placement.

An example of this type of zoom lens is a three-group zoom lens disclosed in the Japanese Laid-Open Patent Publication No. 5-113539. This zoom lens is composed of three lens groups having, in order from the photographic object side, positive, positive, and negative refractive power, and achieves a high variable power ratio of above 2.5, thereby making possible a reduction in the total length of the zoom lens.

However, with the prior art zoom lens described above, the curvature of field and distortion when in the maximum wide-angle state leave much room for improvement.

BRIEF SUMMARY OF THE INVENTION

The object of the present invention is to provide a compact zoom lens with high magnification and excellent imaging throughout the range of zooming for all object distances Thus, the present invention relates to a compact zoom lens for use with a compact lens shutter camera whereby favorable image quality throughout the wide-angle region can be obtained.

The compact zoom lens of the present invention comprises, in order from the photographic object side, a first lens group G1 of positive refractive power, a second lens group G2 of positive refractive power, and a third lens group G3 of negative refractive power. Variable power is achieved by changing the distance between each of these lens groups. When zooming from the maximum wide-angle state to the maximum telephoto state, the distances between the lens groups are reduced. A diaphragm stop is arranged between the first lens group G1 and the second lens group G2. The first lens group G1 comprises a meniscus-shaped negative lens element with the concave surface on the photographic object side and a meniscus-shaped positive lens element with the convex surface on the photographic object side. The second lens group G2 comprises one or more lens elements having a surface that is convex. The third lens group G3 comprises, in order from the photographic object side, a meniscus lens element having an aspheric surface, a positive lens element with the convex surface on the image side, and a meniscus-shaped negative lens element its concave surface on the photographic object side.

BRIEF DESCRIPTION OF THE DRAWINGS

The present invention will become more fully understood from the detailed description given below and the accompanying drawings which are given by way of illustration only, and thus are not limitative of the present invention and wherein.

DETAILED DESCRIPTION

Figure 1:
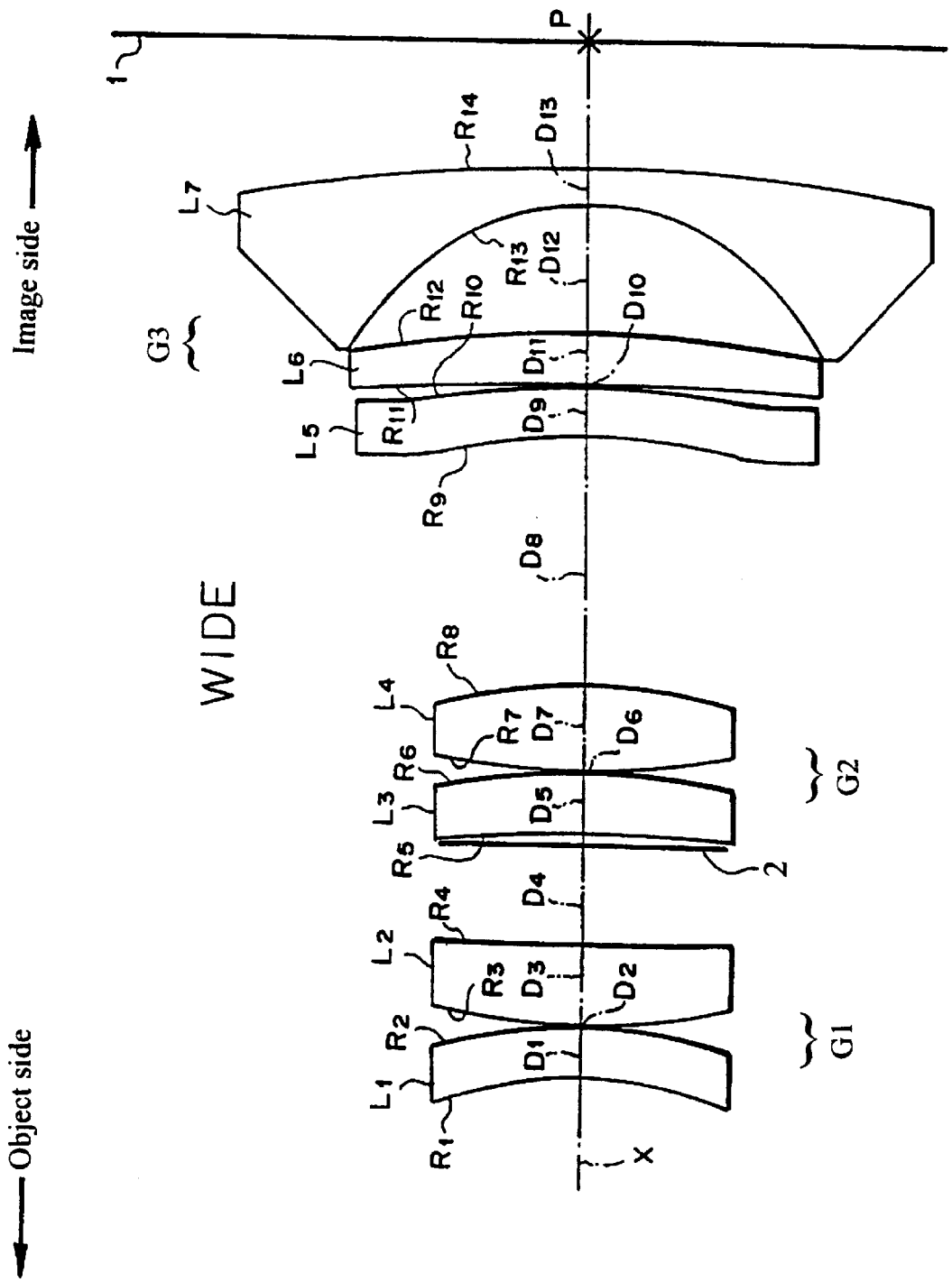
FIG. 1 shows the arrangement of the elements of the compact zoom lens according to the present invention.

The compact zoom lens of the invention is shown in FIG. 1. The zoom lens comprises, in order from the photographic object side, a first lens group G1 of positive refractive power, a second lens group G2 of positive refractive power, and a third lens group G3 of negative refractive power. The compact zoom lens efficiently focuses light onto the image-formation position P of the image plane 1. The focal length of the compact zoom lens is changed by moving each of the lens groups G1–G3 along the optical axis X so as to reduce the distance between the first and second lens groups and between the second and third lens groups at the time of zooming from the maximum wide-angle state to the maximum telephoto state.

The first lens group G1 comprises, in order from the photographic object side, a negative meniscus lens element L1 with the concave surface on the photographic object side, and positive meniscus lens element L2 having two aspheric surfaces with its convex surface on the photographic object side. The second lens group G2 comprises, in the order from the photographic object side, a positive meniscus lens element L3 and a double-convex lens element L4 of which the image-formation side has been figured so as to be aspheric, and with a surface of stronger curvature on the image side. The third lens group G3 comprises, in order from the photographic object, a negative meniscus lens element L5 having two aspheric surfaces with its concave surface on the photographic object side, a positive meniscus lens element L6 having its concave surface on the photographic object side, and a negative meniscus lens element L7 having its concave surface on the photographic object side.

Important features of this zoom lens result from the design of the first lens group G1 and the third lens group G3. By arranging the meniscus negative lens element L1 at the front of the first lens group G1 with the concave surface of L1 on the photographic object side, curvature of field and distortion, which otherwise become a problem when in the maximum wide-angle state, are suppressed. By arranging, immediately behind lens element L1, a positive meniscus lens element L2 with its convex surface on the photographic object side, the back-focus of the compact zoom lens can be held short. Furthermore, in the third lens group G3, by arranging a negative meniscus lens element at the photographic object side, and by figuring each surface of this lens element so as to be aspheric, the deterioration of the performance which usually accompanies compactness of the zoom lens can be effectively prevented. Further, a diaphragm stop 2 is arranged between the first lens group G1 and the second lens group G2.

In addition, the compact three-group zoom lens of the present invention is designed so as to satisfy conditional expressions (1)–(3) below:

$$0.6 < f_{g12}/f_w < 1.4 \tag{1}$$

$$f_{g1}/f_{g2} < 15 \tag{2}$$

$$D_{12} < 1.5 \tag{3}$$

where $f_{g12}$ is the composite focal length in the maximum wide-angle state of the first lens group G1 and second lens group G2, $f_w$ is the focal length of the compact zoom lens in the maximum wide-angle state, $f_{g1}$ is the focal length of the first lens group G1, $f_{g2}$ is the focal length of the second lens group G2, and $D_{12}$ is the ratio of the distance between the first lens group and the second lens group when at the maximum wide-angle state divided by the distance between the first lens group and the second lens group when at the maximum telephoto state.

Figure 2A:
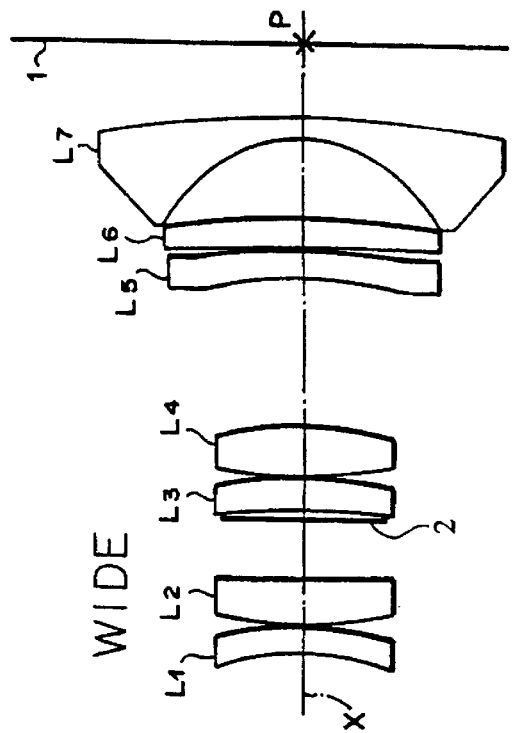
FIGS. 2(a) and 2(b) show the relative positioning of the elements of the compact zoom lens according to the present invention in the maximum wide-angle state and the maximum telephoto state, respectively.
Figure 2B:
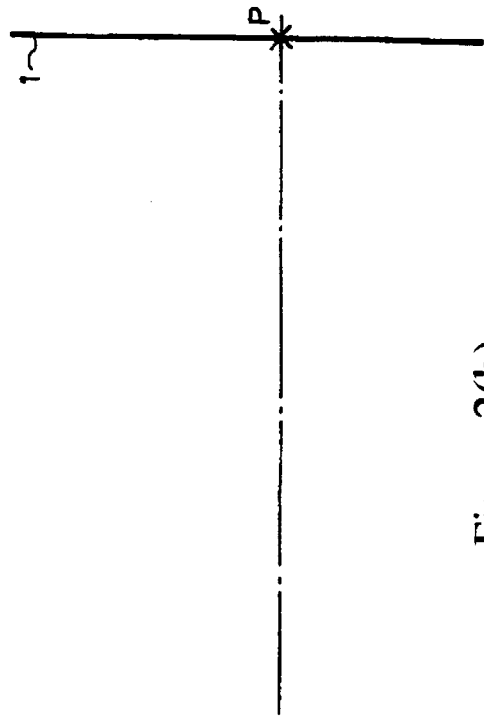

FIGS. 2(a) and 2(b) show the relative positioning of the elements of the compact zoom lens according to the present invention in the maximum wide-angle state and the maximum telephoto state, respectively.

According to the present invention, by designing and positioning the lens elements so that the three conditional expressions described above are satisfied, it becomes possible to satisfy the demands for compactness while favorably correcting the various aberrations which occur at all photographic distances from far to near, especially those which occur in the region of the maximum wide-angle state, thereby obtaining excellent optical performance throughout the zoom range for all values of photographic object distance.

Three embodiments of the invention will hereinafter be given based on specific numerical values.

Embodiment 1

In embodiment 1, the lens element L3 of lens group G2 has its concave surface on the photographic object side. Table 1 shows the values of the radius of curvature R (in mm) of each lens element surface, the on-axis surface spacing D (in mm), as well as the values of the index of refraction $N_d$ and the Abbe number $v_d$ (for the sodium d line) of each lens element of the zoom lens which apply to embodiment 1. The surface numbers # in the table indicate the surface order from the photographic object side.

TABLE 1

| # | R | D | $N_d$ | $v_d$ |
|---|---|---|---|---|
| 1 | −13.311 | 1.47 | 1.84665 | 23.9 |
| 2 | −18.369 | 0.10 | | |
| 3* | 21.037 | 2.37 | 1.51824 | 59.0 |
| 4* | 100.544 | 3.43–2.75 | | |
| 5 | −45.950 | 1.79 | 1.48749 | 70.4 |
| 6 | −26.574 | 0.10 | | |

TABLE 1-continued

| # | R | D | $N_d$ | $v_d$ |
|---|---|---|---|---|
| 7 | −29.204 | 2.59 | 1.49577 | 81.6 |
| 8* | −15.882 | 7.38–0.07 | | |
| 9* | −14.627 | 1.45 | 1.49023 | 57.5 |
| 10* | −22.485 | 0.10 | | |
| 11 | −193.684 | 1.60 | 1.80518 | 25.5 |
| 12 | −42.751 | 3.80 | | |
| 13 | −8.379 | 1.07 | 1.66704 | 44.0 |
| 14 | −66.348 | | | |

In addition, the surfaces with a * to the right of the surface number in Table 1, above, are figured to be aspheric, with an aspheric shape as indicated in equation (4) below.

$$Z = CY^2/\{1+(1-kC^2Y^2)^{1/2}\} + A_4Y^4 + A_6Y^6 + A_8Y^8 + A_{10}Y^{10} \tag{4}$$

where

Z is the distance (in mm) of a point on the aspherical surface from the tangential plane at the lens element surface vertex, C is the curvature (=1/R) of the aspheric surface vertex, Y is the height (in mm) from the optical axis, k is the eccentricity, and $A_4, A_6, A_8, A_{10}$ are coefficient constants of the 4th, 6th, 8th and 10th exponential number terms, respectively, for the aspheric surface.

Further, in Table 2 below, the values for each of the constants K, $A_4, A_6, A_g$, and $A_{10}$ of equation (4), above, are given for the aspheric surfaces indicated by * in Table 1.

TABLE 2

| # | K | $A_4$ | $A_6$ | $A_8$ | $A_{10}$ |
|---|---|---|---|---|---|
| 3 | 2.29568 | −1.53406 × 10⁻⁴ | −1.26331 × 10⁻⁸ | 1.08191 × 10⁻⁸ | −1.09177 × 10⁻⁹ |
| 4 | 1.39885 | −1.00998 × 10⁻⁴ | 2.41393 × 10⁻⁶ | −4.69687 × 10⁻⁸ | 4.59592 × 10⁻¹⁰ |
| 8 | 4.77048 | 1.58714 × 10⁻⁴ | 3.13457 × 10⁻⁶ | −3.78335 × 10⁻⁸ | 3.72225 × 10⁻¹⁰ |
| 9 | 3.45235 | 6.46386 × 10⁻⁴ | −4.30159 × 10⁻⁷ | −3.12001 × 10⁻⁸ | 1.20938 × 10⁻⁹ |
| 10 | 8.23019 | 4.70639 × 10⁻⁴ | −1.81706 × 10⁻⁶ | −3.65633 × 10⁻⁸ | 9.82233 × 10⁻¹⁰ |

Moreover, the zoom lens of embodiment 1 satisfies the conditional expressions (1), (2) and (3) as described above. The focal distance f', f number $F_{No.}$ and the image angle 2ω for the compact zoom lens of this embodiment lie within the following ranges: f'=21.7–61.3; $F_{No.}$=5.1–7.1; and 2ω=76.2°–31.4°.

Figure 3A:
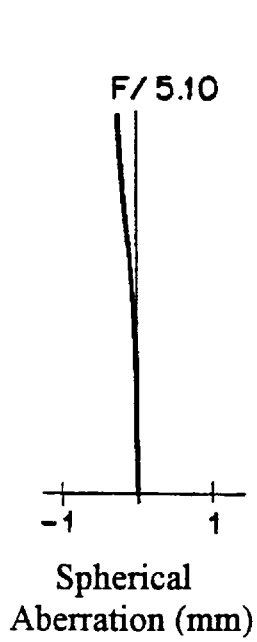
FIGS. 3(a)–3(c) show the spherical aberration, astigmatism and distortion which occur in the maximum wide-angle state, respectively, of the zoom lens of embodiment 1.
Figure 3B:
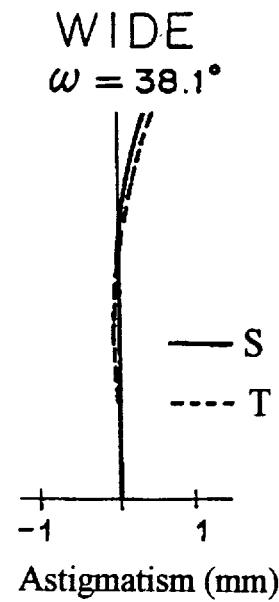
Figure 3C:
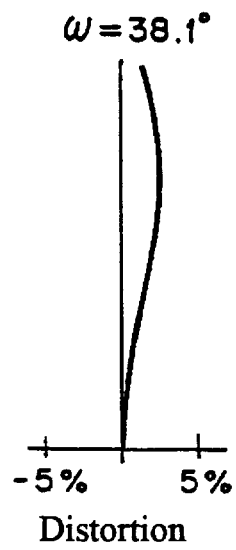

FIGS. 3(a)–3(c) show the spherical aberration, the astigmatism in the sagittal S and tangential T planes, and the distortion, respectively, which occur in the zoom lens of embodiment 1 when in the maximum wide-angle state.

Figure 3D:
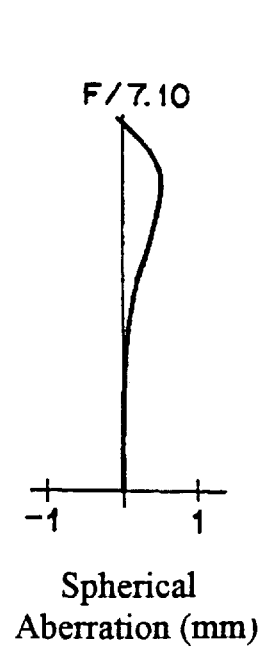
FIGS. 3(d)–3(f) show the spherical aberration, astigmatism and distortion which occur in the maximum telephoto state, respectively, of the zoom lens of embodiment 1.
Figure 3E:
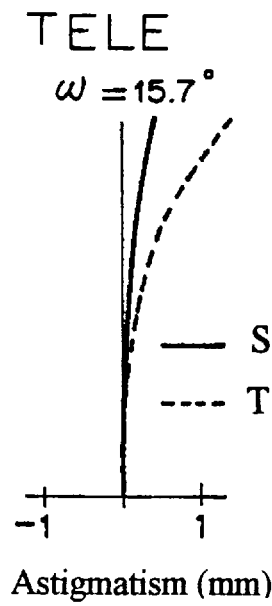
Figure 3F:
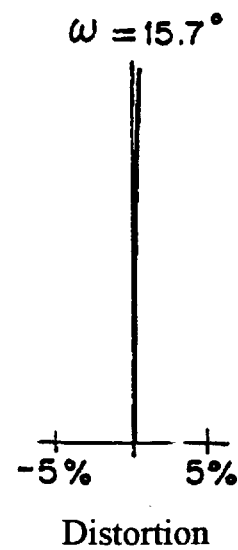

FIGS. 3(d)–3(f) show the spherical aberration, the astigmatism in the sagittal S and tangential T planes, and the distortion, respectively, which occur in the zoom lens of embodiment 1 when in the maximum telephoto state. As is apparent from these figures, these aberrations are all sufficiently small for embodiment 1 to provide excellent imaging performance over the entire range of zoom.

Embodiment 2

In embodiment 2, a positive meniscus lens element L3 having its convex surface on the photographic object side is used in lens group G2, and the surface of the lens element L7 of group G3 is figured so as to be aspheric on the photographic object side. Table 3, below, shows the values of the radius of curvature R (in mm) of each lens element surface, the on-axis surface spacing D (in mm), as well as the values for the sodium d line of the index of refraction $N_d$ and the Abbe number $v_d$ of each lens element of the zoom lens of embodiment 2. The surface numbers (#) in the table indicate the order of the surfaces from the photographic object side.

TABLE 3

| # | R | D | $N_d$ | $v_d$ |
|---|---|---|---|---|
| 1 | −11.765 | 1.47 | 1.84665 | 23.9 |
| 2 | −17.013 | 0.10 | | |
| 3* | 27.470 | 2.37 | 1.60222 | 41.3 |
| 4* | 87.421 | variable (4.67–3.44) | | |
| 5 | 29.520 | 1.79 | 1.74186 | 87.1 |
| 6 | 77.793 | 0.10 | | |
| 7 | 25.480 | 2.59 | 1.49577 | 81.6 |
| 8* | −16.354 | variable(7.19–0.88) | | |
| 9* | −14.468 | 1.45 | 1.49700 | 57.5 |
| 10* | −22.120 | 0.10 | | |
| 11 | −265.009 | 1.60 | 1.80518 | 25.5 |
| 12 | −41.395 | 3.34 | | |
| 13* | −8.833 | 1.07 | 1.81550 | 44.4 |
| 14 | −59.695 | | | |

In addition, the surfaces with a * to the right of the surface number in Table 3, above, are figured so as to be aspheric. The aspheric shape is given by equation (4), above, in conjunction with Table 4, below, which gives the values for each of the constants K, $A_4$, $A_6$, $A_8$, and $A_{10}$ of the aspheric surfaces which apply for embodiment 2.

TABLE 4

| # | K | $A_4$ | $A_6$ | $A_8$ | $A_{10}$ |
|---|---|---|---|---|---|
| 3 | 2.41034 | $-5.51482 \times 10^{-5}$ | $1.91063 \times 10^{-6}$ | $1.68526 \times 10^{-8}$ | $-1.19361 \times 10^{-10}$ |
| 4 | 1.39966 | $-3.89777 \times 10^{-5}$ | $2.82415 \times 10^{-6}$ | $2.17639 \times 10^{-9}$ | $9.10041 \times 10^{-10}$ |
| 8 | 4.86023 | $1.81501 \times 10^{-4}$ | $3.44959 \times 10^{-6}$ | $-5.71433 \times 10^{-8}$ | $-9.89506 \times 10^{-11}$ |
| 9 | 3.63039 | $6.80936 \times 10^{-4}$ | $-5.65432 \times 10^{-7}$ | $-4.25170 \times 10^{-8}$ | $1.34410 \times 10^{-9}$ |
| 10 | 8.30717 | $4.92557 \times 10^{-4}$ | $-3.06237 \times 10^{-6}$ | $-1.20873 \times 10^{-8}$ | $7.54230 \times 10^{-10}$ |
| 13 | 0.78094 | $4.43607 \times 10^{-5}$ | $-2.45463 \times 10^{-6}$ | $3.25195 \times 10^{-8}$ | $-5.34292 \times 10^{-10}$ |

Moreover, the zoom lens of embodiment 2 is composed so as to satisfy the conditional expressions (1), (2) and (3) as described above. The focal distance f', $F_{No.}$ and the image angle 2ω for the compact zoom lens of this embodiment lie within the following ranges: f'=21.7–61.3; $F_{No.}$=5.1–7.1; and 2ω=76.4°–31.2°.

Figure 4A:
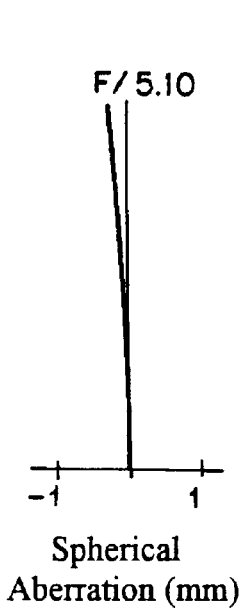
FIGS. 4(a)–4(c) show the spherical aberration, astigmatism and distortion which occur in the maximum wide-angle state, respectively, of the zoom lens of embodiment 2.
Figure 4B:
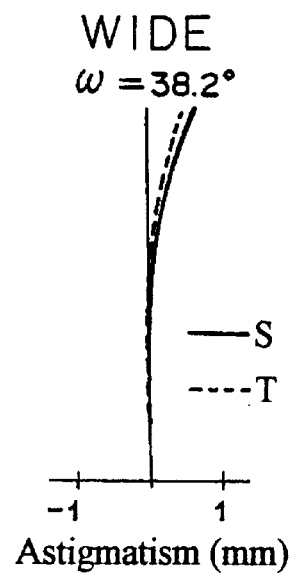
Figure 4C:
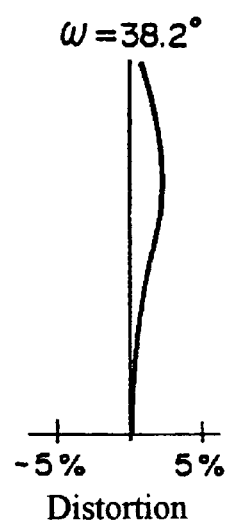

FIGS. 4(a)–4(c) show the spherical aberration, the astigmatism in the sagittal S and tangential T planes, and the distortion, respectively, which occur in the zoom lens of embodiment 2 when in the maximum wide-angle state.

Figure 4D:
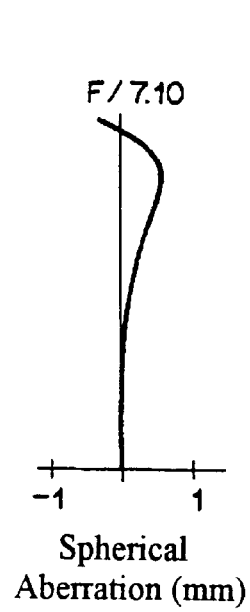
FIGS. 4(d)–4(f) show the spherical aberration, astigmatism and distortion which occur in the maximum telephoto state, respectively, of the zoom lens of embodiment 2.
Figure 4E:
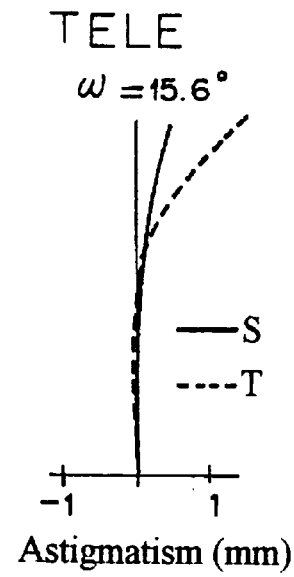
Figure 4F:

FIGS. 4(d)–4(f) show the spherical aberration, the astigmatism in the sagittal S and tangential T planes, and the distortion, respectively, which occur in the zoom lens of embodiment 2 when in the maximum telephoto state. As is apparent from these figures, these aberrations are all sufficiently small for embodiment 2 to provide excellent imaging performance over the entire range of zoom.

Embodiment 3

Table 5, below, shows the values of the radius of curvature R (in mm) of each lens element surface, the on-axis surface spacing D (in mm), as well as the values for the sodium d line of the index of refraction $N_d$ and the Abbe number $v_d$ of each lens element of the zoom lens which to embodiment 3. The surface numbers (#) in the table indicate the order from the graphic object side.

TABLE 5

| # | R | D | $N_d$ | $v_d$ |
|---|---|---|---|---|
| 1 | −11.889 | 1.47 | 1.84665 | 23.9 |
| 2 | −16.468 | 0.10 | | |
| 3* | 22.635 | 2.37 | 1.49251 | 58.7 |
| 4* | 116.515 | variable (3.87–3.14) | | |
| 5 | −65.271 | 1.79 | 1.50226 | 69.5 |
| 6 | −28.153 | 0.10 | | |
| 7 | 23.980 | 2.59 | 1.49577 | 81.6 |
| 8* | −16.027 | variable (7.02–1.02) | | |
| 9* | −14.658 | 1.45 | 1.49023 | 57.5 |
| 10* | −22.323 | 0.10 | | |
| 11 | −250.180 | 1.60 | 1.80518 | 25.5 |
| 12 | −42.460 | 3.34 | | |
| 13 | −8.533 | 1.07 | 1.81550 | 44.4 |
| 14 | −55.926 | | | |

In addition, the surfaces with * to the right of the surface number are figured so as to be aspheric. The aspheric shape is given by equation (4), above, in conjunction with Table 6, below, gives the values for each of the constants K, $A_4$, $A_6$, $A_8$, and $A_{10}$ of the aspheric surfaces apply for embodiment 3.

TABLE 6

| # | K | $A_4$ | $A_6$ | $A_8$ | $A_{10}$ |
|---|---|---|---|---|---|
| 3 | 2.37590 | $-9.30120 \times 10^{-5}$ | $1.56710 \times 10^{-6}$ | $1.52452 \times 10^{-8}$ | $-3.54541 \times 10^{-10}$ |
| 4 | 1.39956 | $-3.39590 \times 10^{-5}$ | $3.76470 \times 10^{-6}$ | $-1.68889 \times 10^{-8}$ | $6.32491 \times 10^{-10}$ |
| 8 | 4.80057 | $1.62176 \times 10^{-4}$ | $2.50053 \times 10^{-6}$ | $-3.44075 \times 10^{-8}$ | $4.49765 \times 10^{-10}$ |
| 9 | 2.98480 | $6.72103 \times 10^{-4}$ | $-6.64761 \times 10^{-7}$ | $-3.08624 \times 10^{-8}$ | $5.26069 \times 10^{-10}$ |
| 10 | 8.23464 | $5.08419 \times 10^{-4}$ | $-1.96693 \times 10^{-6}$ | $-1.57432 \times 10^{-8}$ | $4.57020 \times 10^{-10}$ |

Moreover, the zoom lens of embodiment 3 satisfies the conditional expressions (1), (2) and (3) as described above. The focal distance f', $F_{No.}$ and the image angle 2ω for the compact zoom lens of this embodiment lie within the following ranges: f'=21.7–61.3; $F_{No.}$=5.1–7.1; and 2ω=76.4°–31.2°

Figure 5A:
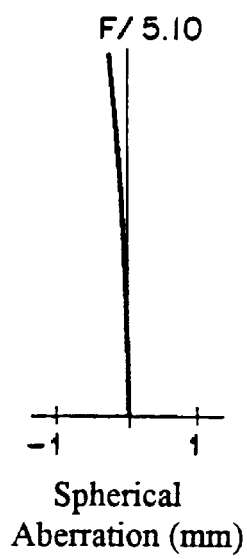
FIGS. 5(a)–5(c) show the spherical aberration, astigmatism and distortion which occur in the maximum wide-angle state, respectively, of the zoom lens of embodiment 3.
Figure 5B:
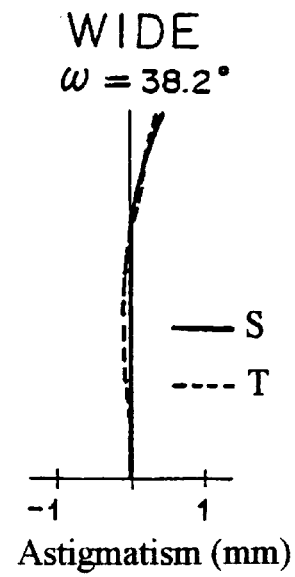
Figure 5C:
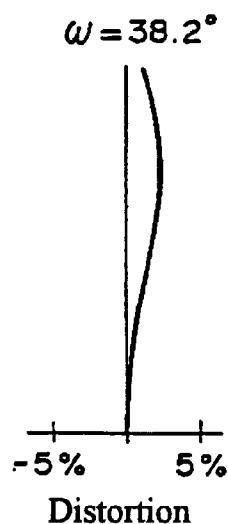

FIGS. 5(a)–5(c) show the spherical aberration, the astigmatism in the sagittal S and tangential T planes, and the distortion, respectively, which occur in the zoom lens of embodiment 3 when in the maximum wide-angle state.

Figure 5D:
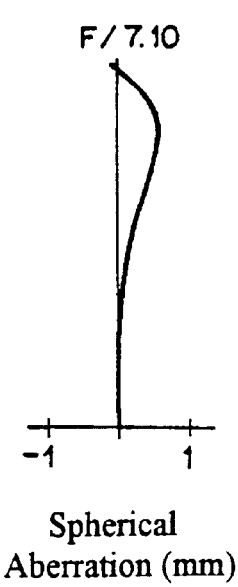
FIGS. 5(d)–5(f) show the spherical aberration, astigmatism and distortion which occur in the maximum telephoto state, respectively, of the zoom lens of embodiment 3.
Figure 5E:
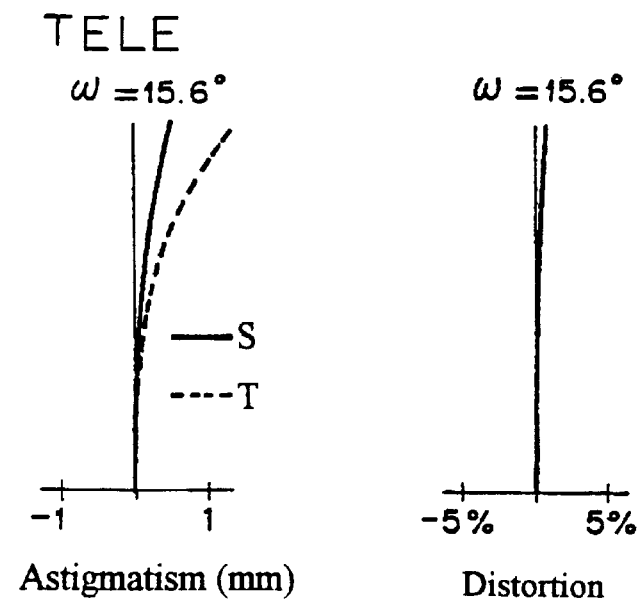
Figure 5F:

FIGS. 5(d)–5(f) show the spherical aberration, the astigmatism in the sagittal S and tangential T planes, and the distortion, respectively, which occur in the zoom lens of embodiment 3 when in the maximum telephoto state. As is apparent from these figures, these aberrations are all sufficiently small for embodiment 3 to provide excellent imaging pserformance over the entire range of zoom.

As described in detail above, by satisfying the above conditional expressions, it is possible to make the zoom lens of the present invention compact while favorably correcting the various aberrations which occur, thereby providing excellent imaging at all possible object distances, even at the maximum wide-angle state.

The invention being thus described, it will be obvious that the same may be varied in many ways. Such variations are not to be regarded as a departure from the spirit and scope of the invention. For example, rather than the aspherical surfaces being formed by figuring a spherical surface, these surfaces may be formed directly by spin casting or using a mold or die. Also, the appropriate selection of the shape of the lens elements which comprise each of the lens groups, the number of aspheric surfaces, and the shape of the aspheric surfaces may be varied, All such modifications as would be obvious to one skilled in the art are intended to be included within the scope of the following claims.

What is claimed is:

1. A compact zoom lens which comprises, in order from a photographic object side:
   a first lens group of positive refractive power, said first lens group including the surface nearest the photographic object side of said compact zoom lens;
   a second lens group of positive refractive power;
   a diaphragm stop located between said first lens group and said second lens group; and, a third lens group of negative refractive power;
   wherein the distance between said second lens group and said third lens group is reduced when zooming from a maximum wide-angle state to a maximum telephoto state, the distance between said first lens group and said second lens group is reduced when zooming from the maximum wide-angle state to the maximum telephoto state, and said first lens group includes a negative meniscus lens element having its concave surface on the object side.

2. The compact zoom lens as set forth in claim 1, said first lens group further including a positive meniscus lens element.

3. The compact zoom lens as set forth in claim 2, said positive meniscus lens element having its convex surface on the photographic object side.

4. The compact zoom lens as set forth in claim 1, wherein said second lens group comprises at least one lens element having a surface that is convex.

5. The compact zoom lens as set forth in claim 4, said first lens group further including a negative meniscus lens element having its concave surface on the photographic object side.

6. The compact zoom lens as set forth in claim 5, said first lens group further including a positive meniscus lens element with its convex surface on the photographic object side.

7. The compact zoom lens as set forth in claim 6, wherein said third lens group comprises, in order from the photographic object side, a meniscus lens element having an aspheric surface, a positive lens element having a convex surface on the image side, and a negative meniscus lens element with its concave surface on the photographic object side.

8. The compact zoom lens as set forth in claim 7, and wherein the following conditional expressions are satisfied:

$$0.6 < f'_{g12}/f'_w < 1.4 \quad (1)$$

$$f'_{g1}/f'_{g2} < 15 \quad (2)$$

$$D_{12} < 1.5 \quad (3)$$

where $f'_{g12}$ is the composite focal length in the maximum wide-angle state of the first lens group and second lens group, $f'_w$ is the focal length of the compact zoom lens when in the maximum wide-angle state, $f'_{g1}$ is the focal length of the first lens group, $f'_{g2}$ is the focal length of the second lens group, and $D_{12}$ is the ratio of the distance between the first lens group and the second lens group when at the maximum wide-angle state divided by the distance between the first lens group and the second lens group when at the maximum telephoto state.

9. The compact zoom lens as set forth in claim 1, wherein said third lens group comprises, in order from the photographic object side, a meniscus lens element having an aspheric surface, a positive lens element having a convex surface on the image side, and a negative meniscus lens element with its concave surface on the photographic object side.

10. The compact zoom lens as set forth in claim 9, and wherein the following conditional expressions are satisfied:

$$0.6 < f'_{g12}/f'_w < 1.4 \quad (1)$$

$$f'_{g1}/f'_{g2} < 15 \quad (2)$$

$$D_{12} < 1.5 \quad (3)$$

where, $f'_{g12}$ is the composite focal length in the maximum wide-angle state of the first lens group and second lens group, $f'_w$ is the focal length of the compact zoom lens when in the maximum wide-angle state, $f'_{g1}$ is the focal length of the first lens group, $f'_{g2}$ is the focal length of the second lens group, and $D_{12}$ is the ratio of the distance between the first lens group and the second lens group when at the maximum wide-angle state divided by the distance between the first lens group and the second lens group when at the maximum telephoto state.

11. The compact zoom lens as set forth in claim 1, and further comprising the compact zoom lens having the construction parameters as set below:

| # | R | D | $N_d$ | $v_d$ |
|---|---|---|---|---|
| 1 | −13.311 | 1.47 | 1.84665 | 23.9 |
| 2 | −18.369 | 0.10 | | |
| 3 | 21.037 | 2.37 | 1.51824 | 59.0 |
| 4 | 100.544 | variable (3.43–2.75) | | |
| 5 | −45.950 | 1.79 | 1.48749 | 70.4 |

-continued

| # | R | D | $N_d$ | $v_d$ |
|---|---|---|---|---|
| 6 | −26.574 | 0.10 | | |
| 7 | −29.204 | 2.59 | 1.49577 | 81.6 |
| 8 | −15.882 | variable(7.38–0.07) | | |
| 9 | −14.627 | 1.45 | 1.49023 | 57.5 |
| 10 | −22.485 | 0.10 | | |
| 11 | −193.684 | 1.60 | 1.80518 | 25.5 |
| 12 | −42.751 | 3.80 | | |
| 13 | −8.379 | 1.07 | 1.66704 | 44.0 |
| 14 | −66.348 | | | | where R is the radius of curvature in mm of each lens element surface #, in order from the object side, D is the on-axis surface spacing in mm, $N_d$ is the index of refraction, and $v_d$ the Abbe number of each lens element, and wherein the surfaces 3, 4, 8, 9 and 10 are figured so as to be aspheric.

12. The compact zoom lens as set forth in claim 1, and further comprising the compact zoom lens having the construction parameters as set forth below:

| # | R | D | $N_d$ | $v_d$ |
|---|---|---|---|---|
| 1 | −11.765 | 1.47 | 1.84665 | 23.9 |
| 2 | −17.013 | 0.10 | | |
| 3 | 27.470 | 2.37 | 1.60222 | 41.3 |
| 4 | 87.421 | variable (4.67–3.44) | | |
| 5 | 29.520 | 1.79 | 1.74186 | 87.1 |
| 6 | 77.793 | 0.10 | | |
| 7 | 25.480 | 2.59 | 1.49577 | 81.6 |
| 8 | −16.354 | variable (7.19–0.88) | | |
| 9 | −14.468 | 1.45 | 1.49700 | 57.5 |
| 10 | −22.120 | 0.10 | | |
| 11 | −265.009 | 1.60 | 1.80518 | 25.5 |
| 12 | −41.395 | 3.34 | | |
| 13 | −8.833 | 1.07 | 1.81500 | 44.4 |
| 14 | −59.695 | | | | where # is the surface number from the object side, R is the radius of curvature in mm of each lens element surface, D is the on-axis surface spacing in mm, $N_d$ is the index of refraction and $v_d$ the Abbe number for the sodium d line of each lens element, and wherein the surfaces 3, 4, 8, 9, 10, and 13 are figured so as to be aspheric.

13. The compact zoom lens as set forth in claim 1, and further comprising the compact zoom lens having the construction parameters as set forth below:

| # | R | D | $N_d$ | $v_d$ |
|---|---|---|---|---|
| 1 | −11.889 | 1.47 | 1.84665 | 23.9 |
| 2 | −16.468 | 0.10 | | |
| 3 | 22.635 | 2.37 | 1.49251 | 58.7 |
| 4 | 116.515 | variable (3.87–3.14) | | |
| 5 | −65.271 | 1.79 | 1.50226 | 69.5 |
| 6 | −28.153 | 0.10 | | |
| 7 | 23.980 | 2.59 | 1.49577 | 81.6 |
| 8 | −16.027 | variable (7.02–1.02) | | |
| 9 | −14.658 | 1.45 | 1.49023 | 57.5 |
| 10 | −22.323 | 0.10 | | |
| 11 | −250.180 | 1.60 | 1.80518 | 25.5 |
| 12 | −42.460 | 3.34 | | |
| 13 | −8.533 | 1.07 | 1.81550 | 44.4 |
| 14 | −55.926 | | | | where # is the surface number in order from the object side, R is the radius of curvature in mm of each lens element surface, D is the on-axis surface spacing in mm, $N_d$ is the index of refraction and $v_d$ is the Abbe number for the sodium d line of each lens element, and wherein the surfaces 3, 4, 8, 9, and 10 are figured so as to be aspheric.

14. A compact zoom lens which comprises, in order from a photographic object side:

a first lens group of positive refractive power, said first lens group including the surface of said compact zoom lens nearest the photographic object side of said compact zoom lens;

a second lens group of positive refractive power;

a diaphragm stop located between said first lens group and said second lens group; and, a third lens group of negative refractive power;

wherein, the distance between said second lens group and said third lens group is reduced when zooming from a maximum wide-angle state to a maximum telephoto state; and said first lens group includes a negative meniscus lens element which has its concave surface on the photographic object side.

15. The compact zoom lens as set forth in claim 14, said first lens group fisher including a positive meniscus lens element.

16. The compact zoom lens as set forth in claim 15, said positive meniscus lens element having its convex surface on the photographic object side.

17. The compact zoom lens as set forth in claim 14, wherein said second lens group comprises at least one lens element having a surface that is convex.

18. The compact zoom lens as set forth in claim 17, said first lens group further including a positive meniscus lens element with its convex surface on the photographic object side.

19. The compact zoom lens as set forth in claim 17, wherein said third lens group comprises, in order from the photographic object side, a meniscus lens element having an aspheric surface, a positive lens element having a convex surface on the image side, and a negative meniscus lens element with its concave surface on the photographic object side.

* * * * *

UNITED STATES PATENT AND TRADEMARK OFFICE
CERTIFICATE OF CORRECTION

PATENT NO : 6,038,083
DATED : March 14, 2000
INVENTOR(S): SATO

It is certified that error appears in the above-identified patent and that said Letters Patent are hereby corrected as shown below:

In Table 4, third column, last line, insert a minus sign before "$4.43607 \times 10^{-5}$";

In column 6, line 9, change "which" to -- which apply --

In column 6, line 11, change "graphic" to -- photographic --;

In column 6, in the second line above Table 6, change "apply" to -- which apply --.

Signed and Sealed this

Twenty-fourth Day of April, 2001

NICHOLAS P. GODICI

*Attest:*

*Attesting Officer*  Acting Director of the United States Patent and Trademark Office